INVENTORS
VICTOR HARMS
JERRY H. SCHWARTZ
by R. J. Filipkowski
PATENT AGENT

INVENTORS
VICTOR HARMS
JERRY H. SCHWARTZ
by R. J. Filipkowski
PATENT AGENT

Jan. 28, 1964 V. HARMS ETAL 3,119,994

SYSTEM FOR READING PERFORATED TAPE RECORD AND TRANSLATOR APPARATUS HAVING ERROR MONITOR CIRCUITS

Filed Aug. 8, 1960 3 Sheets-Sheet 3

INVENTORS
VICTOR HARMS
JERRY H. SCHWARTZ
by R. J. Filipkowski
PATENT AGENT

United States Patent Office 3,119,994

Patented Jan. 28, 1964

3,119,994

SYSTEM FOR READING PERFORATED TAPE RECORD AND TRANSLATOR APPARATUS HAVING ERROR MONITOR CIRCUITS

Victor Harms, 4224 16th St. SW., and Jerry H. Schwartz, 3032 Hampton Crescent, both of Calgary, Alberta, Canada Filed Aug. 8, 1960, Ser. No. 48,014
11 Claims. (Cl. 340—347)

This invention relates to improvements in tape reading apparatus, and more specifically concerns use of proof circuits for detecting an error in a translated output and control means responsive thereto for stopping the reading operation.

In the representation of data in transmission systems it is known to employ translating means for producing a selection of one of a large number of possible selections without resorting to individual allocation of lines or channels for each selection, by the technique of representing information by the concurrent states of each of a limited number of channels or lines, each of which may have only one of two possible states. Accordingly a system employing six simultaneous transmission channels each having a pair of discernible states controllable from a transmitting point may produce any one of $2^6$ possible arrangements at a receiving point when suitable translating means are employed.

Heretofore such systems have not provided the desired accuracy of selection when employed wtih practical transmission systems, particularly where electrical analogues are employed to represent channel states, because the data tend to be obscured in the course of sending and receiving by random electrical noise, drop-outs on channels, and other errors. Consequently it has been necessary to resort to multiple transmission techniques, for example entire return of received data for comparison with outgoing data, with the penalty of a high degree of redundancy and increased system cost measured as capital investment and transmission time. Such systems moreover remain inherently unable to detect errors due to faulty encoding and the check-back operation is equally likely to add errors. It is with the specific problem of providing a multi-channel sending and receiving system for handling encoded information, which has a substantially higher degree of accuracy than prior art systems, and which is capable of self-checking not only the correctness of the originally encoded information but also the fidelity of reproduction of transmitted quantities as received, that the present invention is concerned.

According to the invention, in a telemetering and remote control system wherein a pre-recorded coded record medium is sequentially read by an electro-mechanical multi-channel sensing system, and the signals therefrom are transmitted to a translator for selecting a single output out of a large multiplicity of possible outputs, an auxiliary channel is provided in the original encoded record and the translator includes a monitor sub-system for the purpose of rejecting certain ones of the possible combinations of channel input information, and the reader is provided with a means to stop the advance of the record medium as well as means to hold a given reading stored for an indefinite time until approved or attended to; the translator sub-system being so arranged that in conjunction with the auxiliary channel each reading is tested for validity and where the reading is not acceptable a stop signal is sent back by an additional communication link to prevent further record movement.

In the event that the faulty encoding as received by the translating apparatus has been the result of a fault in the transmission channels between the translator and a correctly functioning reader making a reading of a valid code pattern and where the fault is transient or temporary, the system is automatically able to continue to decode the steadily applied inputs so long as the fault persists, but as soon as an acceptable translation is made the system permits the reader to move to the next set of record data to be read.

In the most general expression of the invention it is immaterial what form of encoded record medium is employed or what form the communications links and transmission channels may take, whether land lines or radio links, and any known form of signal modulation may be employed in representation of channel states. Hence the improvement in the accuracy of transmission and decoding of encoded data may be taken advantage of in various fields of application. In the exemplary embodiments herein described, the invention will particularly be described by way of illustration in conjunction with a record medium in the form of sprocket driven perforated tape having a transverse pattern of six hole information code and an additional code position employed for proof purposes, while the translator is specifically designed to decode the seven input channels to select a single pair of output terminals, one from each of two series of eight oppositely poled output terminals, enabling any one of sixty four valid combinations of output pairs to be selected and an associated matrix to controllably operate respective devices connected therewith.

The translator additionally provides an output when an invalid, i.e., an excluded pattern is received at its inputs, which error output is fed back to the reader tape drive mechanism, for the purpose of stopping the advance of the record and holding the sensing means in the record until self-corrected or attended to.

When the components of a reader-translator system are widely separated, and the translator is fed by land line or radio link, a number of possible faults may develop, particularly transient voltages due to induction effects, as for example where the circuits are influenced by atmospheric electricity. The proof system provided by apparatus according to the invention obviates the need to supervise every error it detects, and takes advantage of the fact that the occurrence of a transient pulse on a channel or channels causing an erroneous decoding will be of short duration, and therefore while the reader is held stationary on a code group, as soon as the system is relieved of the false signal a correct translation will be made, and the operation may proceed unattended. Accordingly the system may conveniently be arranged to give warning of a fault only when the reader is unable to provide an acceptable code pattern within a predetermined time after transmission of a code group.

The invention generally may be practised wherever the data to be transmitted may be represented by positional information group code combinations for handling either in time sequence on a single channel or parallel handling on multiple channels and each group is handled within a pre-determined time interval to produce decoded data. The invention extends to all telemetering systems employing transmitting and receiving instrumentalities capable of handling step-by-step information, each quantity transmitted having its representation as a group pattern of encoding of a plurality of channels for simultaneous consideration or of a single channel in time subdivision where the receiving means is arranged to assemble the serially-transmitted information in plural channel simultaneous state form, the transmission being automatically stopped after each quantity has been dealt with and the quantity held stored, until a return signal approving the validity of the transmission of the quantity as received has been sent back, whereby to allow the next group pattern to be transmitted. The return signal may in fact be the absence of any negating signal within a predetermined time of the transmission, except where an anomalous quantity appears to have been transmitted.

In carrying the invention into effect, a redundant code is employed, wherein an even number N of positions of a code group represented by an equal number of channels are directly encodable in all possible combinations for determining selection made by translating means from a total of Q possible selections where:

$$Q=2^N$$

and where the translator is provided with a serially connected accept/reject branch circuit made up of ranks and files of switch arms whose files are operated in response to signals transmitted on the encoding channels, whereby to reject all transmissions comprised of an odd number of activated channels, and wherein an additional code channel is provided for further conditioning the branch circuit so that code groups comprised of an even number of activated channels, counting the additional channel as part of the group, are accepted as valid for translation.

The branch circuit generally comprises files of electromagnetically actuated switch arms associated with the main decoding switch arms and operated together therewith, each arm of a file being connected in series with the contacts of adjacent switch arms of two ranks of like arms, for directing a connected path therealong encompassing both ranks in a series chain, either to supply potentials of opposite polarity to a pair of selected outputs for a valid decoding, or to produce a reject signal on a return line if an unacceptable translation is detected.

In order that the invention may be more clearly understood and readily carried into effect, it will now be more fully described with reference to the accompanying drawings, in which.

Figure 1:
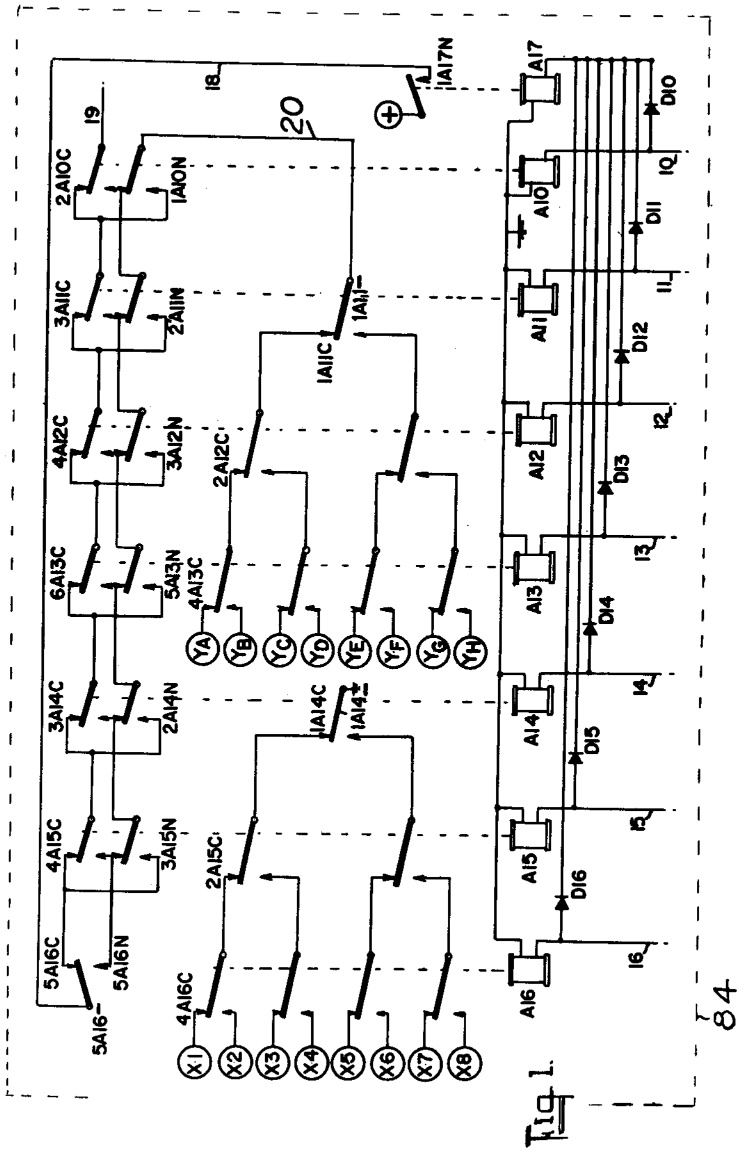
FIG. 1 is a schematic diagram of a translator circuit for a six hole code record having an auxiliary proof channel.

One form of translator with proof channel and error detection return output is represented in the schematic of FIG. 1, drawn for a system having seven channels for information input, designated 10–16, selecting a first output of a first polarity from a group of eight output leads $X_1$–$X_8$, and a second output of opposite polarity from a second group of eight output leads $Y_A$–$Y_H$.

Each of the input channels comprises a lead such as 10–16, connected with a winding terminal of respective relays A10–A16 inclusive, the other winding terminals being at common reference potential, i.e., ground. The application of a positive voltage pulse on any lead energizes the relay winding directly connected therewith, and also energizes, via one of the group of unidirectional conducting elements $D_{10}$–$D_{16}$, the winding of a master supply relay A17 by current passed through the element and the relay winding to ground. All of the unidirectional elements, which may be diode devices, are poled in like sense so that interaction between energized and non-energized leads of the group 10–16, is avoided.

When any one or more of the input leads have received a voltage pulse of appropriate polarity, e.g. positive, the pole 1A17– closes on contact 1A17N and the conductor 18 is thereupon energized from conductor 17, supplied with positive voltage.

It will be helpful to describe at this point the nomenclature employed in this specification for designating circuit elements, in order that cumbersome and repetitious reference to them by name may be avoided. The designation for a relay includes the prefix A, followed by two or more ciphers, as for example A110. Where the relay has one or more poles, a prefix cipher denotes the first, second, or third, etc. pole, for example 1A112–, 3A32–, 7A11–. The suffix dash (–) identifies the coded reference character as a pole or arm of an electromagnetically actuated switch. The normally open contact associated with a pole bears the suffix N and the normally closed contact bears the suffix C, the suffix not changing with the operational state of the switch arm.

Assuming that the solely energized relays A14 and A11 have operated, inspection will show that the selected output leads will respectively be among the group $X_5$–$X_8$, and the group $Y_E$–$Y_H$; this is evident since pole 1A14– makes contact with 1A14N and pole 1A11– makes contact with 1A11N.

Ground will therefore appear at output lead $X_5$, and a path will be continuous from $Y_E$ to 1A11–. A17 being also energized, positive voltage will appear on conductor 18 leading to 5A16–, which remains unoperated since no input was present on line 16. The path may therefore be traced through the sequence:

5A16–, 5A16C, 4A15C, 4A15–, 2A14N, 2A14–, 5A13C, 5A13–, 3A12C, 3A12–, 3A11N, 3A11–, 2A10C, 2A10–, to lead 19.

From the foregoing, it will be seen that no path leads to the selected output lead $Y_E$, and that an error signal is produced, indicating that the combination of inputs (A14, A11) is an excluded and unacceptable code pattern of energized relays.

Considering now the same code pattern, with the addition of an input at lead 10 to energize relay A10, so that the last part of the path traced above reads:

. . . 3A11N, 3A11–, 1A10N, 1A10–, and conductor 20, it is apparent that positive supply is connected through to pole 1A11– and hence by way of the tree branching circuit to the output lead $Y_E$, while no error output signal appears at lead 19. The fact that in this example relay A10 was required to be additionally energized does not imply that for each code pattern the same requirement exists, for positive voltage may be led to conductor 20 by way of either of contacts 1A10C or 1A10N, depending on the disposition of preceding poles of the two ranks shown.

In general it may be said that the degree of redundancy provided by using seven channels (having a maximum capability of 128 selections) instead of the six channels required for choosing among 64 selections, ensures that where only one error occurs at the inputs, that error will be detectable; similarly, if two or more errors occur, as for example through drop-outs of channels or bursts on lines simultaneously, there remains an equal probability that the resulting code pattern will be read as an error instead of an apparently valid translation. The probability of single faults within a reading interval is very much greater than the simultaneous occurrence of two or another even number of faults.

In the allocation of energization patterns for leads 1–16, the valid codes will be characterized by activation simultaneously of 1, 3, 5, or 7 leads. When individual single leads are activated, the probability is greatest that a fault will activate another lead if it occurs at all during the reading interval, and hence such reading would be detected as invalid, while a burst or transient on the activated lead would most probably be ineffective to cancel the energization. Although a fault may activate an input spuriously where no reading exists, the use of a reading interval much shorter than the time interval between consecutive readings of code groups minimizes the possibility of error occurring.

Figure 3:
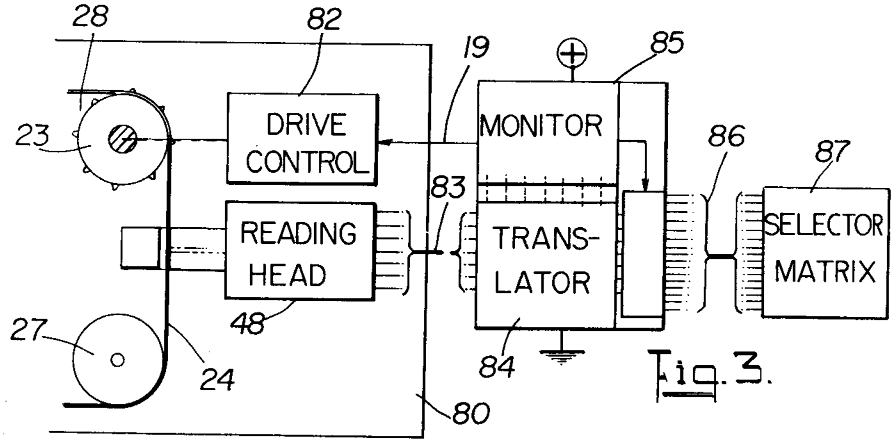
FIG. 3 is a block diagram of a system incorporating the invention.

Referring now to FIGURE 3, a remote control system according to the invention is outlined by its inter-related functional blocks, whereof a tape reader generally designated 80 having a drive control unit 82 for handling tape 24 feeds the multiple channel transmission link 83 to provide plural channel inputs to translator 84. A monitor sub-system designated 85 within the translator provides a pair of alternate energized outputs from positive supply, one serving to energize sets of output leads 86 to a matrix 87 for valid translations, and the other supplying an error warning signal over conductor 19 for invalid translations to stop the drive 81 by means of control unit 82.

Figures 2, 4, 5:
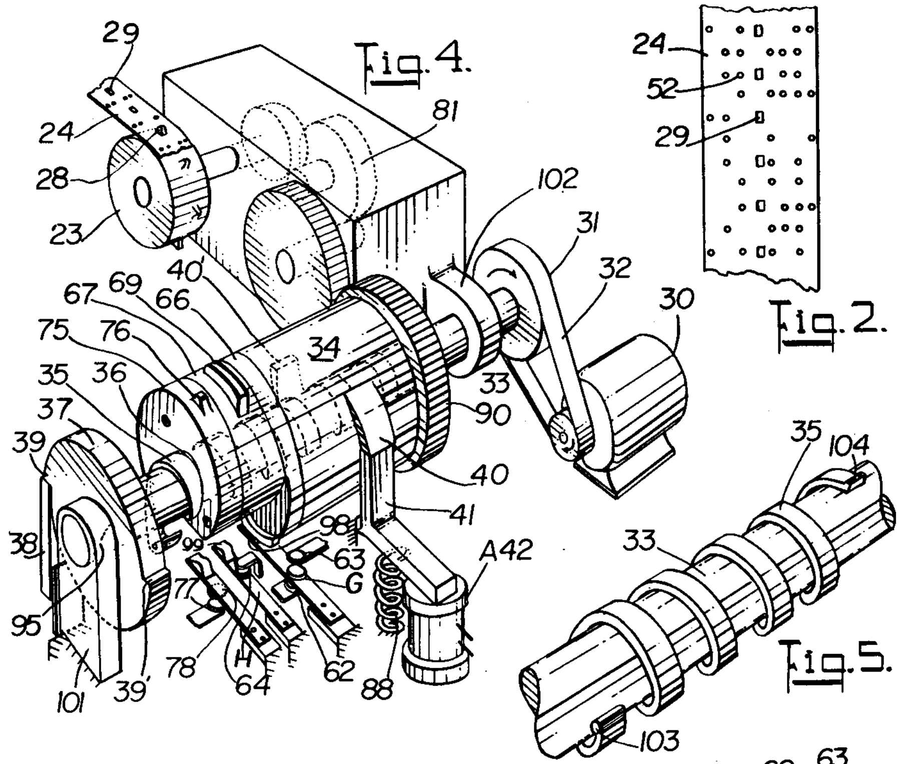
FIG. 2 shows a form of tape record medium.
FIG. 4 illustrates a reader mechanism for intermittent advance of a tape record, and including an error-controlled stop means.
FIG. 5 illustrates a spring clutch member.
Figure 8:
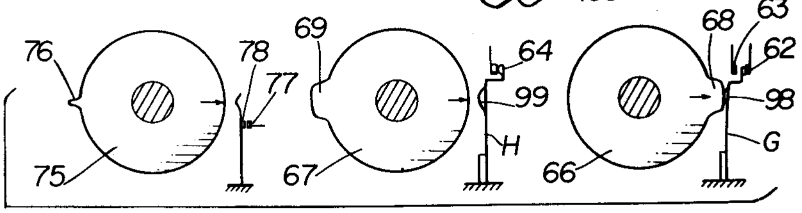
Figure 9:
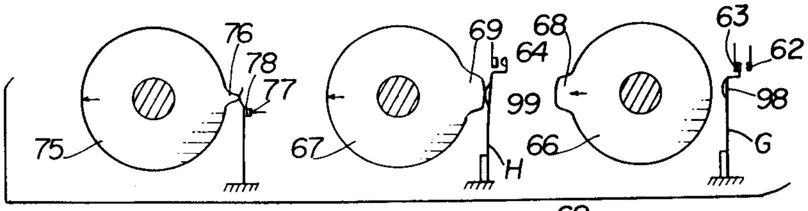
Figure 6:
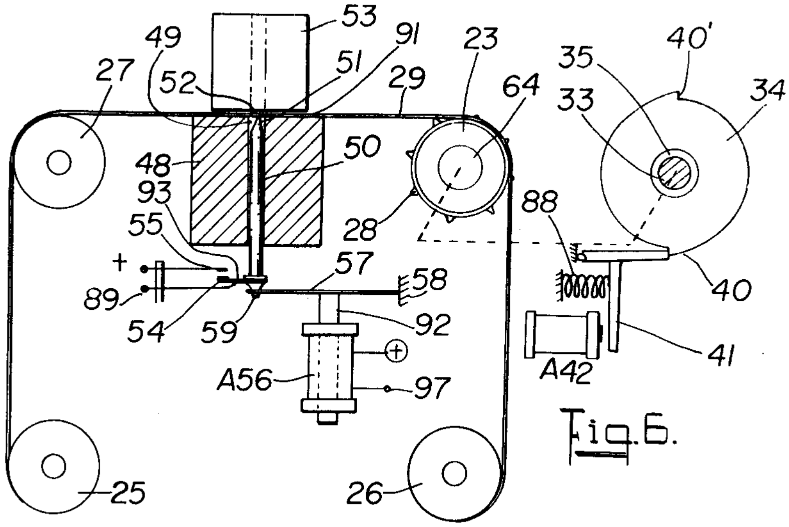
FIG. 6 shows an arrangement of drive and perforation-sensing elements for a tape record.
Figure 7:
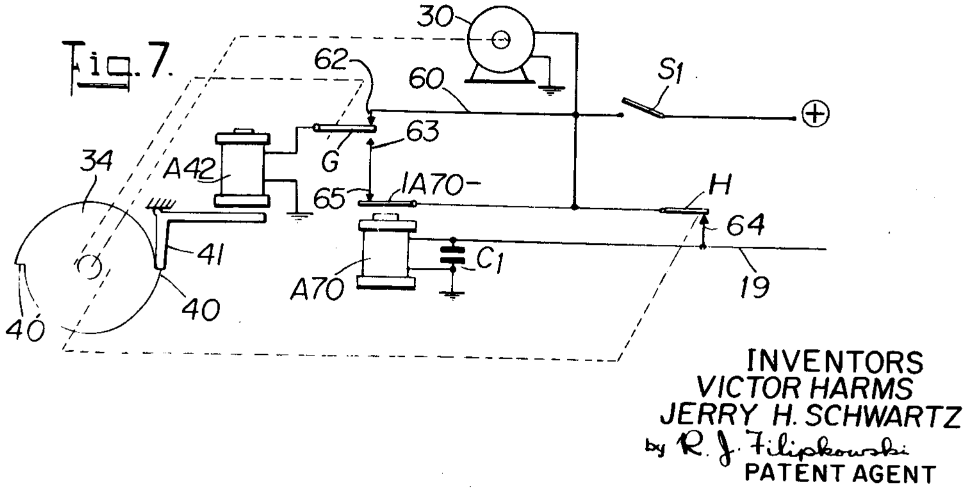
FIG. 7 is a schematic diagram of the control circuit for the reader of FIG. 4; and, FIGS. 8, 9, and 10 illustrate a sequence of angular positions for three switching cams in a tape advance cycle.

Referring additionally to FIGS. 4 and 6, in one practical embodiment a tape reader comprises the tape handling sprocket 23 driven from a powered shaft 33 through an intermediate clutch 34 and coupled gear train 81, the clutch being controlled in accordance with the invention to stop the tape advance when an error is detected by a translator, as will hereinafter be described in further detail.

Motor 30 is preferably a constant speed motor which drives a pulley 31 by V-belt 32 to turn a shaft 33 in the direction indicated by an arrow, the pulley being mounted on an end of the shaft. A cylindriform clutch body 34 has a coaxial bore 36 somewhat larger than the shaft diameter, and is fixed to a pinion 90 coupled in drive relation with a gear train 81 which in turn drives shaft 64 and tape handling sprocket 23 fixed thereon.

The bore 36 of the clutch body through which shaft 33 passes, has a sufficient clearance to permit a helically wound band spring 35 wrapped about the shaft to freely fit within the bore. The inner radius of the free helicoidal spring, removed from the shaft, is slightly less than the shaft diameter and its free outer radius is made a loose fit within the bore.

Shaft 33 supports on its other end a collar 37 having a bore 95 sized for free relative rotation about the shaft. The collar is restrained to have only one direction of rotation, in the direction in which shaft 33 is driven, by means of a pair of ratchet teeth designated 39, 39′, formed on its periphery and arranged to be engaged by spring-biased detent 38.

One end 103 of band spring 35 is fixed to a side of collar 37 and the other end 104 is fixed within the bore 36 of clutch 34 adjacent the pulley end, the sense of winding of the helix being such that if collar 37 is held fixed, the frictional torque exerted by the shaft on the spring tends to wind it more tightly upon the shaft.

Clutch body 34 carries a pair of external stop lugs 40, 40′, having one curved face and having a radial face disposed in a common plane passing through the body axis. As illustrated the detent 41 is in its normal rest position, biased by spring 88, to hold the clutch from rotating by engagement with lug 40. The detent is operable to release the lug when the winding of solenoid A42 is energized. While the clutch is held at rest and spring 35 is in its expanded position, i.e. the inner surface of the helical band is clear of the shaft 33, the latter is free to turn within the bore 36 and runs in journals 101, 102, also freely turning in bore 95. The torsional force due to band spring 35 tends to urge clutch 34 to turn in the direction of shaft rotation to contract the spring diameter.

If detent 41 is momentarily released by application of a current pulse in winding A42 while collar 37 remains held stationary by its detent 38, clutch 34 will initially be rotated in the direction of the shaft solely under impetus of the band spring, and after the spring has tightened sufficiently about rotating shaft 33 the clutch, spring, and collar will be carried by the shaft by reason of friction coupling. The clutch is prevented from running more than 180 degrees however because the radial face of lug 40′ meets detent 41 which will have returned to normal rest position to stop the clutch body. Thereafter, a further limited rotation of the collar 37 and the end of the spring fixed to it, due to momentum of the collar, serves to fully expand the spring to free it from the shaft, while detent 38 prevents the collar from being rotated in reverse direction, i.e., in such sense as would tighten the band spring.

Gear train 81 which couples the clutch pinion 90 with the tape drive sprocket 23 has its elements so chosen that one complete revolution of the clutch advances the tape by one pitch distance, i.e., the distance by which the transverse rows of code perforations are spaced along the tape. In the "home" position, i.e., when the clutch body is held by its lug 40, the tape rests with the sensing fingers 50 (FIG. 6) intermediate two adjacent rows of perforations.

Clutch body 34 carries a cam 75 having a radially projecting narrow sector 76, for closing contact 77 on the grounded contact 78. Solenoid A56 has its one terminal 97 connected with contact 77 and positive supply fed to its other terminal, whereby to actuate pin raising means 92 coupled with flat springs 57, as will be described more particularly hereinafter. The contact closing is timed to occur just prior to the stopping of the clutch by its alternate lug 40′ engaging detent 41.

The lay of perforated record tape 24, passing from feed roll 25 to take-up roll 26, is drawn over idler roller 27 by the action of drive sprocket 23, having peripherally spaced sprocket teeth 28, engaging tape sprocket holes 29, and passes over the surface of a reading head 48 in the gap 91 between the latter and an apertured fixed guide block 53.

Head 48 is apertured with a parallel set of guide holes designated 49, having their axes at right angles to the tape and opening upward, freely guiding therein a group of respective pins 50 reciprocable in the holes. In a raised limit position the upper pointed ends 51 of the pins pass through registering coded data holes such as 52 (see FIG. 2) previously punched in the tape, and enter registering holes in guide 53. While the tape is advancing, the pins are held retracted within the apertures 49 by the resilient support leaf springs 57, the latter having one end fixed in a frame and being attached adjacent their free ends 59 with the lower ends of respective pins.

Springs 57 are chosen to have deflection constants and lengths such that in the absence of a code perforation 52, the tips of pins 50 are stopped by the tape web when solenoid A56 is energized to "read" with its moveable core 92 directing an upward force applied intermediate the ends 58, 59 of springs 57. The lower end of each pin also carries a moveable contact 54 supported on a flat spring 93 to normally rest spaced from a mating contact 55, so that upward movement of pin ends 51 through tape code perforations causes respective sets of contacts 54, 55 to make, and to apply positive potential to terminal 89 leading to a respective one of translator input lines 10–16. At the time that clutch 34 has come to a stop at the end of one-half revolution, against its lug 40′, cam 76 moves contact 77 closed on mate contact 78 to energize solenoid A56, thrusting the set of pins upward, and causing the sets of read-out contacts 54, 55 associated therewith to close where the pins find perforations.

The foregoing description relating to sensing means for reading perforations in a record medium is included as exemplary, the particular arrangement shown forming an illustrative but not limiting expression of record reading apparatus employed as part of the present invention.

The sequence of operations of a reader having the error monitor provision according to the invention will now be described with reference to FIGS. 4, 7, 8, 9 and 10. With start switch $S_1$ temporarily closed, as by manual actuation or by a clock-timed switching apparatus, positive supply voltage is fed over line 60 to start motor 30 and through the upper closed contacts 62 of cam switch arm G, to energize the winding of relay A42 by current to ground. Detent 41 is pulled out, allowing clutch 34 to be driven to its first detention position on lug 40′. When the movement has progressed a few degrees, the upper contact 62 of switch arm G is opened as a follower 98 moves off the radially elevated sector 68 of cam G, to the dwell sector 66. Detent 41 is thereby allowed to return under restoring force of spring 88 into position to stop the clutch when it completes the first 180 degrees of rotation.

Cam switch arm H holds a contact 64 normally closed throughout the greater part of the aforesaid movement to energize the winding A70 from supply, thereby holding contact 65 free of arm 1A70– and so preventing re-energization of A42 over the lower contact 63 of switch arm G which is connected in series with contact 65.

Cam switch arm H opens contact 64 about 10 degrees prior to the completion of the first half revolution (FIG. 9) of cam 34, the arm being operated by raised sector 69 when follower 99 leaves the dwell sector 67. Relay A70 does not de-energize immediately because its winding is shunted by capacitor $C_1$. A suitable time delay is thereby provided which extends through the interval when pins 50 test and enter the perforations of stationary tape 24 to cause an associated translator 84 to produce a circuit selection in response to the code record. If during this interval a voltage is applied to error warning line 19, A70 will be energized and arm 1A70– will stay open. Relay A42 cannot therefore be operated, and the pins 50 remain in testing position in the stationary tape as long as line 19 is energized. If the faulty translation is righted in any manner so that voltage disappears from line 19, A70 will release and A42 will operate, so that clutch 34 thereupon will run to the final position, i.e. one half cycle further. As long as $S_1$ is closed the clutch will continue, moving the code record elements into reading registering relation with head 48.

If the translation of the code hole pattern proceeds with no detected error, i.e. if the pattern as read is not an excluded combination, no voltage will be applied over line 19 but is applied to the tree input terminal 1A11–. At the end of the test interval which may be assigned a duration of about 50 milliseconds, 1A70– will close on contact 65, energizing A42 over the lower contact 63 of arm G, and the clutch is again released to run to the next stop position. While moving from the 180° to the 360° position of the tape advance cycle, cam G closes its upper contact 62 and breaks the lower contact 63 near the end of the arc while switch arm H closes with contact 64 from shortly after the beginning of the arc throughout the remainder of the angular displacement. At the end of the full revolution of the clutch the equipment is prepared to again receive a "start-read" pulse on line 60.

It is to be noted that the raising and lowering of pins 50 is effected only in a narrow arc of clutch angular positions at the half-revolution rest position of the clutch, while drum 23 holds tape 24 with the pattern of code perforations registered with the apertures 49.

Figure 10:
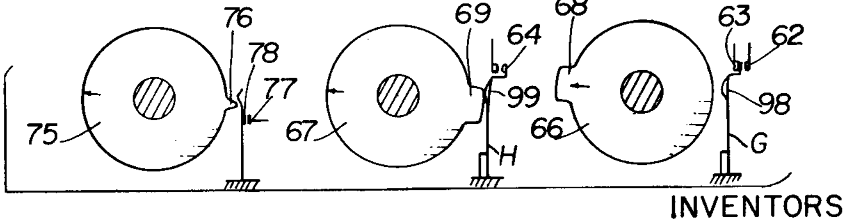

In one specific embodiment for high speed reading, the cam sector 68 was shaped to close switch arm G on contact 62 throughout the arc of rotation from 350° to 15°; sector 69 was shaped to open contact 64 from 170° to 190°, i.e., closing again just after the position shown in FIG. 10; and projection 76 on cam body 75 was timed to make contacts 77, 78 at 180° (as in FIG. 9) with a tolerance of three degrees. All angular positions are referred to zero corresponding to the basic rest position of clutch 34 held by detent 41 against lug 40.

While a six hole code modified for seven channels has been described, the monitoring function may be employed with any even number of data channels and one additional proof channel plus one channel for translation monitoring. The monitoring line 19 may be of any form, for example an earth return, a wire line, or a radio link. Also, whereas a matrix selector operable from the joint outputs of a pair of tree branching switching circuits has been referred to, the invention may be practiced in systems where but a single tree circuit is employed.

We claim:

1. In combination with apparatus for reading the record in one code on a record medium from information storage elements spaced therealong in a direction, a sensing device for reading the elements, a supply source, electrical circuit means for translating the record read from said one code into a different code, drive means for cyclically sequentially advancing said record medium in said direction from an initial position to a reading position and from said reading position to a final position, said drive means including time delay means for holding said medium in reading position for a predetermined interval, a drive control means, said electrical circuit means comprising switching arms connected in tree relation and relay actuating means connected to convert said code reading through said tree into a different code in accordance with connections of said switching arms, and error monitor means comprising a plurality of ranks and files of other switching arms connected with said source and actuated by said relays to energize said electrical circuit means for predetermined readings and to operate said control means to hold said record medium stopped in reading position for error readings.

2. Apparatus for converting information recorded on a tape record medium as groups of transverse perforations spaced along the tape in one code to a different code for electrical transmission to a matrix selector, comprising drive mechanism for advancing said tape group by group, sensing means for reading said groups one at a time, a supply source, electrical circuit means including a switching tree circuit, relay means connected with said sensing means and energizable thereby in accordance with a code reading to set up a path through said switching tree to convert said reading into said different code, and means to exclude transmission of predetermined ones of said readings comprising a chain of connected switching arms actuatable by said relay means and connected with said supply to provide a pair of alternate signal outputs in accordance with relay energization states, said signal outputs respectively representing non-excluded and excluded readings, means responsive to said first signal to energize said switching tree circuit to transmit said different code, and means responsive to said other signal effective to stop said drive mechanism with said sensing means in reading relation with a perforation group.

3. In combination with a device for reading a perforated tape record in one code, said record having groups of transverse perforations spaced therealong, a sensing head for reading said code record, drive mechanism for cyclically advancing said tape by increments from an initial position to a reading position and from said reading position to a final position, a supply source, a drive control, a translator connected with said sensing head for translating a reading from said one code into a different code and comprising an electrical circuit having switching arms connected in tree branching relation and relay means connected with said sensing head to operate said switching arms to select an output terminal in accordance with the relay states, and a monitor circuit having ranks and files of further switching arms actuatable by said relay means and being interconnected to form a series path for feeding said supply in series with said switching tree to energize said selected terminal for predetermined code readings and for feeding said supply to said drive control to hold said drive mechanism stopped with said head in reading relation with said tape for code record readings other than said predetermined readings.

4. The combination set forth in claim 3 wherein a pair of switching trees respectively select output terminals, said terminals being interconnected by loads in matrix relation, and wherein said supply is connected with said series path to energize said selected terminals for said predetermined code record readings.

5. The combination set forth in claim 3 wherein said drive control includes time delay means for holding said drive mechanism stopped with said head in reading relation with said tape perforations for a predetermined interval of time for said predetermined code record reading.

6. In a device for reading a coded record on a strip medium, said strip medium having record code elements spaced in a direction, a sensing means for reading said elements, a drive mechanism for advancing said medium relatively to said sensing means, a drive control means, electrical circuit means including record controlled means co-operating with said control means for advancing said medium intermittently and for stopping a reading upon detection of error, said electrical circuit means comprising a source of supply, a tree circuit having an input and a plurality of outputs and comprising files of switching arms connectable to select one output from said plurality, relay means energizable in accordance with a reading for actuating said arms to make said selection, a monitor circuit comprising further switching means actuated by said relay means for connecting said supply with said path to energize said selected output for predetermined readings and for connecting said supply to said control means to stop said drive for other readings.

7. A device as set forth in claim 6 wherein said drive mechanism comprises a motor, a drive shaft driven by the motor, a strip transport means, a friction clutch coupled with said strip transport means and clutch control means controllably coupling said clutch with said shaft, said clutch control means including stop means co-operating with said clutch for limiting clutch movement in one direction between a pair of limit positions in which said code elements are respectively held in non-reading relation with said sensing means and in reading relation therewith, and wherein said drive control means comprises means to hold said strip in said reading relation for a predetermined interval and for operating said clutch control to cause said strip medium to be advanced to non-reading relation with said head after the expiry of said interval.

8. A device for reading a record medium having coded information elements recorded thereon in spaced relation, comprising a reading head co-operative with said elements to produce outputs in accordance with readings of said coded information elements, drive means effective to move said medium intermittently in the direction of element spacing relatively to said head, drive control means for moving said medium to register elements in reading relation with said head and time delay means for holding said elements registered in reading relation with said head for an interval of time and for advancing said medium thereafter to a position with said head intermediate adjacent elements, an electrical supply, a translator having said output connected as input effective to convert said code record as read into electrical signals of a different code, said translator having monitor means for detecting an invalid conversion of said coded information elements and for producing an error signal, means responsive to said error signal for suppressing said electrical signals, and drive control means responsive to said error signal effective to over-ride said time delay means to hold said medium stopped with said head registered in reading relation with said coded information elements.

9. In combination with a matrix selector for selecting connected loads in accordance with code records, reading means for electrically energizing a plurality of information channels in accordance with said code records, a translator for converting said code records as read in said channels into a different code for actuating said matrix selector, a source of electrical supply, a validity check circuit for said different code comprising in combination, a like plurality of relay means connected with respective channels, a first and a second tree branching circuit each having an even numbered group of output terminals connected with said matrix selector, files of switching arms connected in said tree branching circuits between said input and output terminals, the arms of each file being actuatable between a pair of positions corresponding to the energized or de-energized states of respective relays to connect a selected output terminal with each input terminal, a monitor means comprising further files of switching arms actuated by said relay means and interconnected in series to provide a path between said source of electrical supply and either one of a first and a second monitor terminal so that one arm of each file is in circuit in said path for any relay energization state and so that said first monitor terminal is energized from said supply for predetermined code record readings to energize said selected output terminals and so that the second monitor terminal is energized from said supply to suppress energization of tree output terminals and to signal a code conversion error for other predetermined code record readings.

10. The combination as set forth in claim 9 further including an additional relay, means to actuate said relay when any channel is energized, and means actuated by said additional relay and interposed between said supply and said path to connect said supply in series with said path.

11. The combination as set forth in claim 9 including two tree branching circuits having their output terminals connected by matrix loads wherein the number of arms in respective files of each tree increases between said input and said output terminals thereof in binary progression.

References Cited in the file of this patent

UNITED STATES PATENTS 2,958,727 Barbeau ---------------- Nov. 1, 1960